United States Patent
Kawasaki et al.

(10) Patent No.: US 6,399,711 B1
(45) Date of Patent: Jun. 4, 2002

(54) PROCESS FOR THE PREPARATION OF RUBBER-REINFORCED STYRENE RESIN

(75) Inventors: Toshiharu Kawasaki, Yokohama; Susumu Tanji, Kawasaki, both of (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/555,628

(22) PCT Filed: Jun. 4, 1998

(86) PCT No.: PCT/JP98/02489

§ 371 (c)(1), (2), (4) Date: Jun. 2, 2000

(87) PCT Pub. No.: WO99/62976

PCT Pub. Date: Dec. 9, 1999

(51) Int. Cl.$^7$ .............................................. C08F 279/02
(52) U.S. Cl. ............................ 525/316; 525/52; 525/53
(58) Field of Search ............................. 525/316, 52, 53

(56) References Cited

FOREIGN PATENT DOCUMENTS

| JP | A-63113009 | 5/1988 |
| JP | A-63118315 | 5/1988 |
| JP | 03007708 A | * 1/1991 |
| JP | A-6192346 | 7/1994 |

* cited by examiner

*Primary Examiner*—James J. Seidleck
*Assistant Examiner*—Olga Asinovsky
(74) *Attorney, Agent, or Firm*—Birch, Stewart, Kolasch & Birch, LLP

(57) ABSTRACT

The present invention relates to a process for producing a rubber reinforced styrene-based resin, using a polymerization apparatus comprising: a prepolymerizer; mixing means and a circulating reactor connected with a circulation line; and a plug-flow type reactor, which process comprises: continuously feeding a stock solution into the prepolymerizer; feeding the prepolymerized liquid into the mixer; in this mixer, mixing the prepolymer liquid with circulated liquid that is circulated from the circulating reactor at a flow amount of from 0.5 to 3 times (circulation flow ratio: volume ratio) the flow amount of the prepolymer liquid fed from prepolymerizer into the mixing means; particulating and dispersing the rubbery polymer in the mixed liquid by mechanical shear force; and then feeding the polymer liquid into the plug-flow type reactor, to thereby effect a polymerization. The production process of the present invention makes it possible to produce, at a high speed, products of uniform qualities which are excellent in the balance among impact strength, appearance characteristics and coloring properties, without changing the mechanical shear force which controls the particle size.

15 Claims, 1 Drawing Sheet

PROCESS FOR THE PREPARATION OF RUBBER-REINFORCED STYRENE RESIN

This application is the national phase under 35 U.S.C. § 371 of PCT International Application No. PCT/JP98/02489 which has an International filing date of Jun. 4, 1998, which designated the United States of America.

TECHNICAL FIELD

This invention relates to a process for producing rubber reinforced styrene-based resins. More particularly, it relates to a process for producing rubber reinforced styrene-based resins which makes it possible to produce, at a high speed, products with uniform qualities which are excellent in the balance among impact strength, appearance characteristics and coloring properties, without changing the applied mechanical shear force which controls the particle size.

BACKGROUND ART

To produce a rubber reinforced styrene-based resin being excellent in coloring properties, impact strength and appearance characteristics, it is required to regulate the particle size and particle size distribution of rubber particles dispersed in the resin and the molecular weight of the continuous phase each within an appropriate range. It is a well known fact that the particle size of rubber particles is a particularly important predominant factor. The appearance of a resin is improved with a decrease in the rubber particle size. However, the impact strength of the resin is decreased with a decrease in the rubber particle size. It is generally considered that optical rubber particle size is from 0.8 to 3 $\mu$m.

In general, the rubber particle size is determined at a certain point with a conversion ratio of styrene-based monomer of from 5 to 20% under a circumstance where a styrene solution of a rubbery polymer becomes a dispersion phase while a styrene solution of a polystyrene resin becomes a continuous phase (i.e., phase transformation occurs) by a shear of mechanical stirring and these are further subjected to a mechanical shear. This phase transformation is not completed instantly but proceeds over a considerably long time and large space. Therefore, the shear force for achieving the desired rubber particle size is determined depending on the rotary speed of and retention time in the reactor, mixer, etc. by which the shear force is applied.

To produce products of the same quality at a high speed by using the same polymerization apparatus, it is, therefore, needed to increase the amount of a stock solution fed into a reactor. In this case, however, the retention time in the reactor is shortened and, in its turn, the shear force suffered at the phase transformation is lowered, which results in an enlarged particle size. To overcome this problem, it has been a general practice to elevate the rotary speed of a stirrer by which the rubber particle size is regulated in order to enhance the mechanical shear force, whereby the resulting rubber particle size is adjusted to the desired value. To largely elevate the production speed, however, a large shear force should be applied. Therefore, it is needed to preliminarily enhance the capacity of the apparatus (e.g., mechanical strength, motor ability, etc.), which may be highly difficult due to the design of the apparatus used. So long as a certain level of mechanical strength can be ensured, the shear force can be enhanced by elevating the rotary speed. Over a critical point, however, the flow of a polymer liquid per se in the rotational direction becomes increased. As a result, the shear effect is saturated, and hence the desired rubber particle size may be hardly achieved merely by the mechanical shear force.

In order to produce products of the same quality at a high speed with the use of the same polymerization apparatus, there has been another method, besides the mechanical shear force, which is constituted by lowering the molecular weight of a rubbery polymer used. However, it is not desirable to lower the molecular weight of the rubbery polymer, since the impact strength, etc. of the obtained rubber reinforced styrene-based resin might be deteriorated thereby.

On the other hand, a process of the present invention is similar to the production process disclosed in JP-A-63-113009 (the term "JP-A" as used herein means an "unexamined published Japanese patent application"). The process disclosed in this publication is directed to an object of improving the mechanical strength (e.g., impact strength) of a resin by increasing the content of a styrene-based polymer contained in dispersed rubber particles. Therefore, it is stated therein that the amount of the polymer returned from a circulating reactor into a mixer is from 12 to 35 parts by weight, preferably from 17 to 30 parts by weight, per 100 parts by weight of the polymer fed from the prepolymerizer into the mixer. When the amount of the circulated liquid falls within this range, the rubber particle size in the product cannot be changed and thus the productivity cannot be elevated owing to the circulation ratio. Accordingly, the present invention completely differs from JP-A-63-113009.

On the other hand, JP-B-59-17725 (the term "JP-B" as used herein means an "examined Japanese patent publication") discloses a production process which involves no such prepolymerization step as employed in the present invention. By this process, it is impossible to achieve the objects of the present invention in terms of the balance among impact strength, appearance characteristics and coloring properties.

An object of the present invention is to provide a process for producing a rubber reinforced styrene-based resin which makes it possible to produce, at a high speed, products excellent in the balance among impact strength, appearance characteristics and coloring properties, without changing the mechanical shear force which controls the particle size.

DISCLOSURE OF THE INVENTION

The present inventors have conducted extensive studies and consequently found out that the above-mentioned object of the present invention can be achieved by adjusting polymer concentrations in each of a prepolymer liquid and a circulated liquid and the mixing ratio of these two liquids to an appropriate range.

Accordingly, the present invention provides a process for producing a rubber reinforced styrene-based resin which comprises the following steps:

a step of prepolymerizing a styrene-based monomer stock solution containing from 2 to 15% by weight of a rubbery polymer;

a step of feeding the prepolymer liquid prepolymerized in the above step into to a circulating reactor via mixing means;

a step of circulating the polymer liquid from the circulating reactor back into the mixing means at a flow amount of from 0.5 to 3 times the flow amount of the prepolymer liquid fed into the mixing means, to substantially uniformly mix the prepolymer liquid and the polymer liquid by the mixing means; and a step of further polymerizing the polymer liquid polymerized in the circulating reactor, in a plug-flow type reactor.

As an embodiment of the present invention, examples can be exemplified as follows:

a production process, using a polymerization apparatus comprising: a prepolymerizer; mixer and a circulating reactor connected with a circulation line; and a plug-flow type reactor, which process comprises: continuously feeding a stock solution containing from 2 to 15% by weight of a rubbery polymer dissolved therein into the prepolymerizer; feeding the prepolymerized liquid into the mixer; in this mixer, mixing the prepolymer liquid with circulated liquid that is circulated from the circulating reactor at a flow amount of from 0.5 to 3 times (circulation flow ratio: volume ratio) the flow amount of the fed prepolymer liquid; particulating and uniformly dispersing the rubbery polymer in the mixed liquid by mechanical shear force; and then feeding the polymer liquid into the plug-flow type reactor, to thereby effect a polymerization;

a process for producing a rubber reinforced styrene-based resin as described above, wherein the polymer concentration in the circulated liquid fed from the circulating reactor into the mixing means is adjusted to from 3.7A to 45% by weight, provided that A represents the concentration (expressed in % by weight) of the rubbery polymer in the stock solution; and a process for producing a rubber reinforced styrene-based resin as described above, wherein the polymer concentration fed from the prepolymerizer into the mixing means is adjusted to from 1.2A to 2.8A % by weight, provided that A represents the concentration (expressed in % by weight) of the rubbery polymer in the stock solution.

BEST MODE FOR CARRYING OUT THE INVENTION

Figure 1:
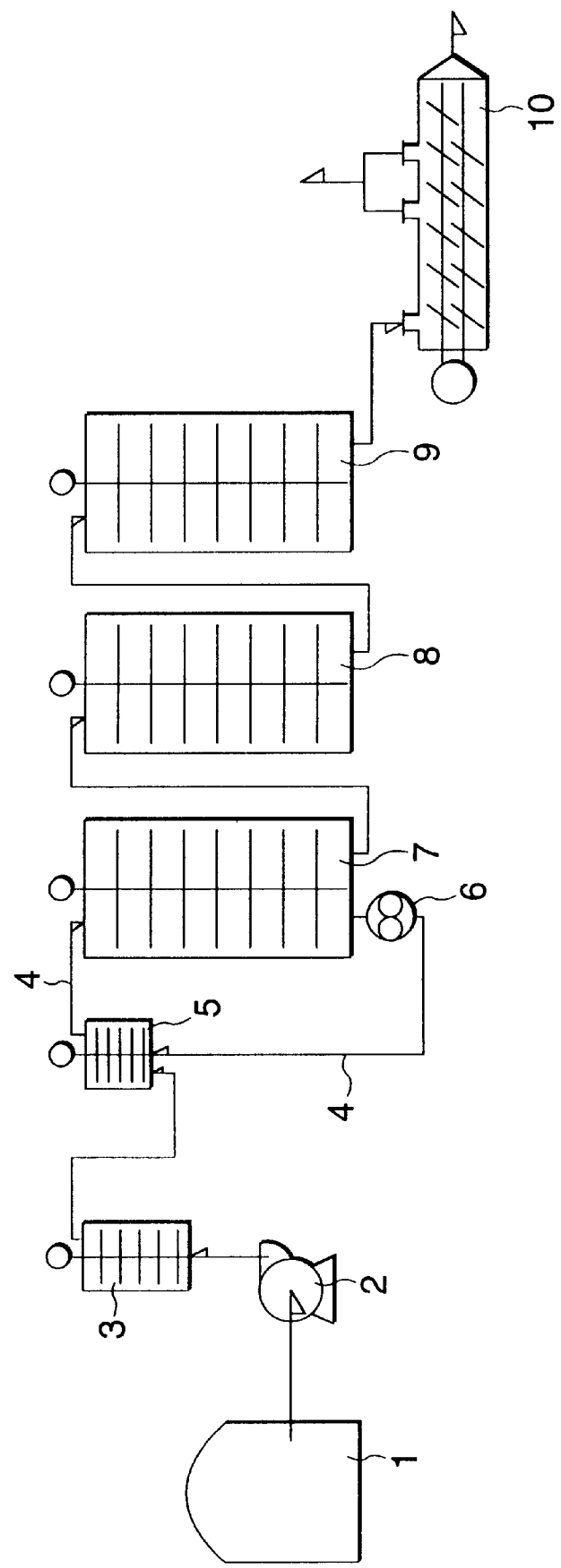
FIG. 1 is a flow-chart which schematically shows the apparatus employed in the Examples of the process of the present invention.

The prepolymerization step of the present invention aims at graft-polymerizing the styrene-based monomer with the rubbery polymer. The prepolymerizer is not particularly restricted in its type, and one having stirring blades or one having a static mixer can be made, so long as it is equipped with a mechanism for eliminating the reaction heat. From the viewpoint of effecting graft uniformly onto the rubbery polymer, it is preferred to use a prepolymerizer having a high plug-flow. More particularly, it is preferred to use one equivalent to a complete mixing tank line model that causes little back mixing and which has at least 5 stages, still preferably at least 9 stages.

The circulation step involves a step of returning a portion of the polymer liquid from the circulating reactor into the above-mentioned mixing means, and further comprises returning the polymer liquid from the circulating reactor into the mixing means at a flow amount of from 0.5 to 3 times the flow amount of the prepolymer liquid fed into the mixing means, and substantially uniformly mixing the prepolymer liquid and polymer liquid with each other by the mixing means. Moreover, the resultant mixed liquid of the prepolymer liquid and polymer liquid is fed into the circulating reactor and polymerized. In other words, a circulation line is formed between the mixing means and the circulating reactor.

The circulation line for use in the present invention comprises the mixing means and the circulating reactor. It is preferred that the circulating reactor is one equipped with stirring blades. Although means for circulating the reaction liquid is not particularly restricted, a pump is generally employed therefor.

The circulating reactor is not particularly restricted in its type, so long as the reaction temperature can be controlled thereby. It is preferred to use one having stirring blades, and either a complete mixing type reactor or a plug-flow type reactor may be used. The stirring power may be one ensuring the removal of the polymerization heat and temperature control, and stirring power necessary for controlling the rubber particle size is not needed.

The mixing means for use in the present invention is not particularly restricted in its structure. That is, various mixers or stirrers can be used, though mixing means capable of mixing two liquids within a short period of time and forming a dispersion of the rubbery polymer is preferred. Either a complete mixing type mixer or a tower type mixer may be used. It is also possible to employ mixers of special types, for example, HOMOMIXER (trade name) manufactured by Tokushu Kakoki K. K., SMJ-30 MIXER (trade name) and SMJ-100 MIXER (trade name) each manufactured by Sakura Seisakusho K.K., and W-1 MIXER (trade name) and U MIXER (trade name) each manufactured by Satake Kagaku K. K. However, it is undesirable to employ a mixer or operation conditions that apply a large shear force so as to cleave the rubber molecular chains. For example, when a tower type mixer equipped with rod-shape stirring blades is used, it is preferred to regulate the average linear speed of the stirring blades to 0.1 to 3.0 m/sec and the ratio of weight-average particle size/number-average particle size of rubber particles to not more than 3.0.

In the mixing means, the rubbery polymer undergoes phase transformation and thus rubber particles are formed. The capacity of the mixer to be used is not particularly restricted, but is preferably from 1/5 to 1/20 by volume as large as the capacity of the circulating reactor. When the capacity of the mixer is too large, mixing uniformity therein is deteriorated. As a result, the dispersed rubber particles show a broad particle size distribution. This is undesirable because the appearance characteristics and coloring properties are deteriorated thereby. When the mixer capacity is too small, on the other hand, the retention time in the mixer becomes excessively short. In this case, the two liquids cannot be sufficiently mixed and the rubbery polymer is not distributed enough. This is undesirable because there arises a problem that the final product is contaminated with untransformed rubbery polymers, or further that the rubber particle size per se can be hardly controlled. As for the mixer type, the plug-flow type accompanied with little short pass is preferred to the complete mixing type. Much short pass may causes the contamination of the product with undispersible large rubber particles, which deteriorates the appearance characteristics of the product.

The plug-flow type reactor for use as the circulation reaction or for use in the subsequent steps in the process of the present invention may be either a tower type reactor equipped with stirring blades or a tube type reactor equipped with a built-in static mixer, so long as it is equipped with a unit capable of controlling the reaction temperature and the flowability of the polymer liquid shows practical plug-flow characteristics. Further, two of more of these reactors may be used. The capacity of the plug-flow type reactor is preferably from 1 to 4 times as much as that of the circulating reactor, though not particularly restricted thereto.

The stock solution for use in the present invention is a solution of a rubbery polymer dissolved in a styrene-based monomer.

Examples of the styrene-based monomer include styrene and α-methylstyrene monomers. If necessary, it may further contain monomers copolymerizable with styrene or α-methylstyrene, for example, (meth)acrylate, butyl acrylate, methyl methacrylate, butyl methacrylate, methyl acrylate or acrylonitrile.

Examples of the rubbery polymer include polybutadiene, SBR, polyisoprene, nitrile rubber and natural rubber.

The stock solution containing, as main components, these styrene-based monomer and rubbery polymer has a composition of: from 85 to 98% by weight of the styrene-based monomer and from 2 to 15% by weight of the rubbery polymer, preferably from 88 to 97% by weight of the styrene-based monomer and from 3 to 12% by weight of the rubbery polymer, and more preferably from 90 to 97% by weight of the styrene-based monomer and from 3 to 10% by weight of the rubbery polymer. If necessary, the stock solution may further contain a polymerization solvent such as ethyl benzene or toluene in an amount up to 15% by weight based on the whole stock solution. Moreover, it is possible to add thereto molecular weight regulators, initiators having a 10 hours-half life temperature of 70 to 140° C., for example, 1,1-bis(tert-butylperoxy)cyclohexane, 1,1-bis(tert-butylperoxy)3,3,5-trimethyl cyclohexane, tertiaryperoxy benzoate, ditertiary peroxide, 2,5-dimethyl-2,5-bis(tert-butylperoxy)hexane and tert-butyl peroxy isopropyl monocarbonate [PERHEXA C, PERHEXA 3M, PERBUTYL Z, PERBUTYL D, PERHEXA 25B and PERBUTYL I (trade names), each manufactured by Nippon Oils & Fats, Co., Ltd.], plasticizers such as mineral oils and silicone oils, antioxidants, etc. The term "stock solution" as used herein further involves those containing monomers copolymerizable with the styrene-based monomer, if needed.

When the stock solution contains a polymerization solvent, etc., the term "the concentration of the rubbery polymer in the stock solution" means the proportion of the rubbery polymer to the whole solution containing the polymerization solvent, etc.

The term "rubber reinforced styrene-based resin" as used in the production process of the present invention includes resins having: a continuous phase comprising a polymer which comprises styrene, α-methylstyrene, etc. or a copolymer of styrene or α-methylstyrene, etc. with a monomer copolymerizable therewith including, for example, (meth) acrylate (e.g., butyl acrylate, methyl methacrylate, butyl methacrylate, methyl acrylate, etc.) and acrylonitrile; and a dispersion phase comprising rubber particles made of rubbery polymers such as polybutadiene.

In the production process of the present invention, the flow amount of the polymer liquid circulated from the circulating reactor to the mixing means is adjusted to from 0.5 to 3 times (circulation flow ratio: volume ratio), preferably from 0.7 to 2.7 times and more preferably from 0.8 to 2.5 times, the flow amount of the prepolymer liquid fed from the prepolymerizer into the mixer. When this ratio is less than 0.5, the circulated liquid contains only a small amount of the rubbery polymer which has been sufficiently grafted and serves as a surfactant. As a result, the rubbery polymer cannot be satisfactorily dispersed in the mixer and thus fails to form complete particles, resulting in lowering the production speed. In this case, the particle size distribution becomes extremely broad and thus the appearance characteristics are deteriorated. Moreover, the grafting amount at the interface of the rubber particles is undesirably reduced, resulting in poor coloring properties. When the above-mentioned ratio exceeds 3, on the other hand, the retention time in the mixer is shortened and the polymer concentration becomes excessively high. This causes insufficient mixing of the prepolymer liquid and the circulated liquid, and it becomes difficult to control the particle size of the rubbery polymer within the desired range. As a result, the production speed is lowered. Furthermore, the polymer incorporated in the rubber particles partly undergoes a morphological change and the coloring properties are deteriorated.

In the production process of the present invention, it is preferred that the polymer concentration in the circulated liquid fed from the circulating reactor is adjusted to from 3.7A to 45% by weight, more preferably from 4.0A to 42% by weight, and still preferably from 4.2A to 40% by weight, with respect to the concentration of the rubbery polymer in the stock solution, A % by weight. When the polymer concentration is less than 3.7A, there is a concern that the rubbery polymer cannot be sufficiently dispersed by the mixing means and thus fails to form complete particles. Therefore, in such a case, the production speed tends to be lowered in order to control the rubber particle size within the desired range. Furthermore, the particle size distribution tends to be broadened, which is undesirable from the viewpoints of appearance characteristics and coloring properties. When the polymer concentration exceeds 45% by weight, on the other hand, the difference in viscosity between the prepolymer liquid and the circulated liquid becomes excessively large. As a result, the prepolymer liquid cannot be sufficiently mixed with the circulated liquid and, therefore, the particle size of the rubbery polymer can be hardly controlled within the desired range. Thus, the production speed tends to be lowered. Furthermore, the polymer incorporated in the rubber particles partly undergoes a morphological change, which is undesirable from the viewpoint of coloring properties.

In the prepolymerizer, prepolymerization is preferably performed so that the polymer concentration in the prepolymer liquid to be fed into the mixing means becomes to be from 1.2A to 2.8A % by weight, more preferably from 1.2A to 2.6A % by weight and still preferably 1.2A to 2.4A % by weight, with respect to the concentration of the rubbery polymer in the stock solution, A % by weight. When the polymer concentration is less than 1.2A, the polymer is grafted with the rubbery polymer only in a small amount and therefore a small particle size can be hardly achieved. As a result, the production speed is lowered. This is also undesirable from the viewpoint of the balance among mechanical strength, appearance characteristics and coloring properties. When the polymer concentration exceeds 2.8A, on the other hand, the particle size can be hardly controlled in the mixing means and therefore the production speed is lowered. Furthermore, the particle size distribution is broadened, which is undesirable from the viewpoint of appearance characteristics.

The term "polymer concentration" in the prepolymerizer, circulating reactor or plug-flow type reactor used in the present invention means a weight ratio of a styrene-based resin formed by the polymerization with the rubbery polymer to the respective solution. Namely, it represents a ratio (% by weight) of a dry polymer, which is obtained by adding a large amount of methanol to the polymer liquid and drying the polymer thus precipitated, to the respective polymer liquid.

According to the production process of the present invention, products having the desired rubber particle size and well-balanced impact strength, appearance characteristics and coloring properties can be produced at a high speed by adjusting the flow rate (circulation flow ratio) of the prepolymer liquid fed from the prepolymerizer to the mixing means to the circulated liquid from the circulating reactor, within the range specified as an essential element of the present invention.

In the production process of the present invention, it is preferred that the polymer concentration in a polymer liquid at the outlet of the plug-flow type reactor that is employed after the circulating reactor, is controlled to at least 75% by weight. When this polymer concentration is less than 75% by weight, the load applied onto a recovery system becomes large and, further, the degree of crosslinking of rubber particles can be hardly controlled. The polymer liquid come out of the plug-flow type reactor is introduced into a recovery system in which unreacted monomers, polymerization solvent, etc. are removed therefrom and the remaining polymer is pelletized.

To the rubber reinforced styrene-based resin in the present invention, additives can be added to the stock solution, or in the step of polymerization, recovery or pelletization. Examples of the additive include those commonly employed for styrene-based resins, for example, antioxidants such as IRGANOX 1076 (trade name) manufactured by Ciba-Geigy AG, plasticizers such as mineral oils, mold releasing agents such as stearic acid and zinc stearate, coloring agents, antioxidants, flame-retardants, etc. Alternatively, the pellets may be mixed with these additives in an extruder.

In each reactor, the polymer concentration can be adjusted by appropriately controlling temperature, the amount of an initiator or other additives, as usually conducted in manufacturing styrene-based resins. The temperature range in preferably from 90 to 120° C. in the prepolymerizer, from 90 to 140° C. in the circulating reactor and from 110 to 170° C. in the plug-flow type reactor.

EXAMPLES

The present invention will be illustrated in greater detail with reference to the following Examples. The measurement methods of physical properties, etc. are as follows.

(a) Polymer Concentration 5 g of a polymer liquid is precisely weighed and about 20 cc of methanol is added thereto. After heating in a vacuum dryer at 200° C. under 10 mmHg for 20 minutes, the residue is precisely weighed and the solid content (% by weight) is calculated.

(b) Rubber Particle Size (RPS)

Measurement is made by using a Coulter counter (manufactured by Coulter Corporation) as specified below.
Machine body: MULTISIZER MODEL II.
Measuring unit: MULTISIZER MODEL IIE.
By using an electrolyte composed of dimethylformamide and ammonium thiocyanate, the volume-average 50% median radius is determined. (The MODEL II and MODEL IIE described above correspond respectively to MODEL 2 and MODEL 2E.)

(c) Izod Strength

Determined in accordance with ASTM D6381.

(d) Appearance Characteristics

A dumbbell specimen is formed at a molding temperature of 220° C. and a mold temperature of 60° C., and a site 5 cm apart from the gate is evaluated in accordance with JIS Z8741.

(e) Coloring Properties

A definite amount of red dye is added to pellets. After extruding the mixture from a single-screw extruder at from 200 to 220° C., a plate (9 mm×5 mm×2 mm) is molded at a mold temperature of 60° C. and a molding temperature of from 180 to 220° C. using an injection molding machine. Then this plate is observed with naked eyes to compare the concentration of the color to thereby evaluate the coloring properties.

The apparatus employed herein is as follows.

FIG. 1 is a flow-sheet which schematically shows the apparatus employed in the Examples of the process of the present invention.

A stock solution prepared in a stock solution tank (1) is fed into a prepolymerizer (3) by a stock solution-feeding pump (2). The prepolymerizer (3) is a plug-flow type reactor having a capacity of 1 liter and an L/D value of 10 (L: length, D: diameter) and equipped with rod-type stirring blades of 10 stages. The prepolymer liquid come out of the prepolymerizer (3) is introduced into a mixer (5). This mixer (5) is a plug-flow type reactor having a capacity of 0.5 liter and an L/D value of 10 and equipped with rod stirring blades of 5 stages. The polymer liquid come out of the mixer is introduced into a circulating reactor (7) via a circulation line (4). This circulating reactor (7) is a plug-flow type reactor having a capacity of 6 liter an L/D value of 10 and equipped with rod stirring blades of 30 stages.

A portion of the polymer liquid come out of the circulating reactor (7) is circulated into the mixer (5) through the circulation line (4) by the circulation pump (6). On the other hand, the residual polymer liquid is introduced successively into the reactor (8) and the reactor (9). The reactors (8) and (9) have the same structure and capacity as those of the circulating reactor (7). The prepolymerizer, mixer and reactors (7), (8) and (9) are each equipped with an external jacket by which temperature can be controlled with steam.

The polymer liquid come out of the reactor (9) is introduced into a vent-type twin-screw extruder (10), in which the polymerization solvent, unreacted monomers, etc. are removed. The rubber reinforced styrene-based resin discharged from the twin-screw extruder is pelletized. In the case shown in FIG. 1, the "circulation line" as described in claim 1 is composed of the mixer (5) and the circulating reactor (7), while the "plug-flow type reactor" as described in claim 1 is composed of the reactors (8) and (9).

Examples 1 to 4

To each composition as shown in Table 1 was added an organic peroxide, 1,1-bis(tertiary peroxy)cyclohexane (PERHEXA C (trade name), manufactured by Nippon Oils and Fats Co., Ltd.) so as to give a concentration thereof of 150 ppm in the stock solution tank (1), thus preparing a stock solution. This stock solution was then fed into the prepolymerizer. As the rubbery polymer, polybutadiene (DIENE 55 (trade name) having a viscosity in the form of a 5 wt. % styrene solution of 165 cps) manufactured by Asahi Chemical Industry Co., Ltd.) was used. α-Methylstyrene dimer was used as the molecular weight regulator. The temperature in the mixer was adjusted to about 80° C. On the other hand, the temperatures in the prepolymerizer, circulating reactor and plug-flow type reactors (8) and (9) were controlled so as to have the temperature gradients as shown in Table 1 in the flow direction. The polymer concentration at the outlet of the final reactor was regulated to about 80% by weight. The rotary speeds of the stirrers in the prepolymerizer (3), mixer (5), circulating reactor (7) and plug-flow type reactors (8) and (9) were set to constant at 50 rpm, 200 rpm, 50 rpm, 20 rpm and 5 rpm, respectively. The feed rate of the stock solution was controlled so as to give a rubber particle size of the product of 1.8 μm. Under these conditions, production speeds providing products of the same quality were compared. Table 2 shows the physical properties of the rubber reinforced styrene-based resins thus obtained and the production speeds.

Examples 5 to 9

The procedure of Example 3 was repeated under the same conditions, except for changing the polymer concentration in the circulating reactor and employing the conditions as specified in Table 1 so as to obtain the same products. The results regarding physical properties and production speed are shown in Table 2.

Examples 10 to 12

The procedure of Example 3 was repeated under the same conditions, except for changing the polymer concentration in the prepolymerizer and employing the conditions as specified in Table 1 so as to obtain the same products. The results regarding physical properties and production speed are shown in Table 2.

Comparative Examples 1 to 3

The procedure of Example 3 was repeated under the same conditions, except for changing the circulation ratio and employing the conditions as specified in Table 1. The results regarding physical properties and production speed are shown in Table 2.

In Comparative Example 1, the same feed rate as that of Example 3 was employed. However, the obtained rubber particle size exceeded the objected size (1.8 μm) and thus the same products as those of Example 3 could not be obtained.

In Comparative Example 2, the feed rate was lowered so as to give the objected rubber particle size (1.8 μm). As a result, the feed rate became 2.6 liter/hr, compared with 5.4 liter/hr in Example 3. The production speed in this example was extremely low (1.8 kg/hr) compared to the production speed (3.9 kg/hr) achieved in Example 3. The obtained products were also poor in appearance characteristics and coloring properties.

In Comparative Example 3, the feed rate was lowered to 2.0 liter/hr, compared with that (5.4 liter/hr) in Example 3. However, the rubber particle size could not be reduced to the objected size (1.8 μm) and thus the same products as those of Example 3 could not be obtained.

Comparative Example 4

The procedure of Example 3 was repeated under the same conditions, except for using no prepolymerizer but feeding the stock solution directly into the mixer and employing the conditions as specified in Table 1. The results regarding physical properties and production speed are shown in Table 2. Compared with the products of Example 3, the thus obtained products were inferior in physical properties, in particular, Izod strength.

Example 5

The procedure of Example 3 was repeated under the same conditions, except for using no mixer but making the prepolymer liquid confluent with the circulated liquid from the circulating reactor by the circulation line and employing the conditions as specified in Table 1. The results regarding physical propertied and production speed are shown in Table 2. Products having the objected particle size (1.8 μm) could not be obtained.

TABLE 1

| | Feed rate (L/hr) | Composition of stock solution | | | | Prepolymerizer temp. (° C.) | Circulating reactor temp. (° C.) | Plug-flow reactor temp. (° C.) |
| | | Styrene (wt. %) | Rubbery polymer (wt. %) | Ethylbenzene (wt. %) | M.W. regulator (ppm) | | | |
|---|---|---|---|---|---|---|---|---|
| Ex. 1 | 3.8 | 85.0 | 6.0 | 9.0 | 700 | 100–110 | 110–120 | 125–155 |
| Ex. 2 | 4.3 | 86.0 | 6.0 | 8.0 | 500 | 105–115 | 115–125 | 130–160 |
| Ex. 3 | 5.4 | 88.0 | 6.0 | 6.0 | 100 | 110–120 | 125–135 | 140–170 |
| Ex. 4 | 4.0 | 86.0 | 6.0 | 8.0 | 600 | 100–110 | 115–125 | 125–155 |
| Ex. 5 | 2.8 | 84.0 | 6.0 | 10.0 | 1000 | 95–105 | 100–110 | 120–150 |
| Ex. 6 | 3.3 | 85.0 | 6.0 | 9.0 | 800 | 100–110 | 105–115 | 125–155 |
| Ex. 7 | 5.0 | 88.0 | 6.0 | 6.0 | 100 | 110–120 | 130–140 | 135–165 |
| Ex. 8 | 3.3 | 85.0 | 6.0 | 9.0 | 800 | 100–110 | 115–125 | 120–150 |
| Ex. 9 | 2.7 | 84.0 | 6.0 | 10.0 | 1100 | 95–105 | 115–125 | 115–145 |
| Ex. 10 | 4.6 | 88.0 | 6.0 | 6.0 | 300 | 105–115 | 125–135 | 140–170 |
| Ex. 11 | 4.2 | 86.0 | 6.0 | 8.0 | 500 | 110–120 | 115–125 | 130–160 |
| Ex. 12 | 2.8 | 84.0 | 6.0 | 10.0 | 1000 | 115–125 | 115–125 | 130–160 |
| Comp. Ex. 1 | 5.4 | 88.0 | 6.0 | 6.0 | 100 | 110–120 | 125–135 | 140–170 |
| Comp. Ex. 2 | 2.6 | 83.0 | 6.0 | 11.0 | 1100 | 95–105 | 105–115 | 115–145 |
| Comp. Ex. 3 | 2.0 | 81.0 | 6.0 | 13.0 | 2000 | 90–100 | 100–110 | 110–140 |
| Comp. Ex. 4 | 3.1 | 84.0 | 6.0 | 10.0 | 900 | — | 115–125 | 120–150 |
| Comp. Ex. 5 | 2.0 | 81.0 | 6.0 | 13.0 | 2000 | 90–100 | 100–110 | 110–140 |

TABLE 2

|  | Feed rate (L/hr) | Circn. flow rate (by vol) | Polymer conc. of circ. liq. from circ. reactor (wt. %) | Polymer conc. of liq. from prepolymerizer (wt. %) | Size of particles from prepolymerizer (μm) | Izod impact strength (kg-cm/cm) | Appearance (%) | Coloring (naked eyes) | Particle size of product (μm) | Production speed of product of 1.8 μm (kg/hr) |
|---|---|---|---|---|---|---|---|---|---|---|
| Ex. 1 | 3.8 | 0.5 | 30.0 | 12.0 | 1.9 | 9.8 | 61 | ⊚ | 1.8 | 2.7 |
| Ex. 2 | 4.3 | 0.7 | 30.0 | 12.0 | 2.0 | 9.8 | 62 | ⊚ | 1.8 | 3.1 |
| Ex. 3 | 5.4 | 1.5 | 30.0 | 12.0 | 1.9 | 10.0 | 64 | ⊚ | 1.8 | 3.9 |
| Ex. 4 | 4.0 | 2.7 | 30.0 | 12.0 | 1.9 | 10.1 | 61 | ⊚ | 1.8 | 2.9 |
| Ex. 5 | 2.8 | 1.5 | 21.0 | 12.0 | 2.2 | 9.5 | 59 | o | 1.8 | 2.0 |
| Ex. 6 | 3.3 | 1.5 | 23.0 | 12.0 | 2.0 | 9.7 | 61 | ⊚ | 1.8 | 2.4 |
| Ex. 7 | 5.0 | 1.5 | 35.0 | 12.0 | 1.9 | 10.0 | 63 | ⊚ | 1.8 | 3.6 |
| Ex. 8 | 3.3 | 1.5 | 42.0 | 12.0 | 2.0 | 10.1 | 61 | ⊚ | 1.8 | 2.4 |
| Ex. 9 | 2.7 | 1.5 | 47.0 | 12.0 | 2.0 | 9.6 | 59 | o | 1.8 | 2.0 |
| Ex. 10 | 4.6 | 1.5 | 30.0 | 7.5 | 2.0 | 9.7 | 62 | ⊚ | 1.8 | 3.3 |
| Ex. 11 | 4.2 | 1.5 | 30.0 | 15.0 | 1.9 | 9.8 | 62 | ⊚ | 1.8 | 3.0 |
| Ex. 12 | 2.8 | 1.5 | 30.0 | 18.0 | 1.9 | 9.6 | 58 | o | 1.8 | 2.0 |
| Comp. Ex. 1 | 5.4 | 0.3 | 30.0 | 12.0 | 2.7 | 9.3 | 44 | x | 2.6 | — |
| Comp. Ex. 2 | 2.6 | 0.3 | 30.0 | 12.0 | 2.2 | 9.4 | 54 | x | 1.8 | 1.8 |
| Comp. Ex. 3 | 2.0 | 4.2 | 30.0 | 12.0 | 2.6 | 9.2 | 46 | x | 2.5 | — |
| Comp. Ex. 4 | 3.1 | 1.5 | 30.0 | — | 1.9 | 8.0 | 55 | x | 1.8 | 2.2 |
| Comp. Ex. 5 | 2.0 | 1.5 | 30.0 | 12.0 | 2.4 | 9.0 | 49 | x | 2.3 | — |

Coloring: ⊚: excellent, o: good, x: poor.

Industrial Applicability

In the production process of the present invention, the polymer concentration in the prepolymer liquid, the polymer concentration in the circulated liquid and the mixing ratio of these two liquids are regulated each within an appropriate range and a uniform mechanical shear force is applied by mixing means. Thus, products which are excellent in the balance among impact strength, appearance characteristics and coloring properties can be produced. Moreover, products having well-balanced these properties can be produced at a high speed even under a constant mechanical shear force. These advantages, which cannot be achieved by conventional techniques, are achieved by controlling so that the rubbery polymer in the prepolymer liquid is appropriately grafted, the viscosity ratio of the prepolymer liquid to the circulated liquid is in an appropriate range for facilitating mixing and regulating the flow ratio of the prepolymer liquid and the circulated liquid within an appropriate range by using rubber particles having sufficient rubbery polymer grafted therewith. To elevate the production speed, it is an usual practice to elevate the mechanical shear force. According to the process of the present invention, in contrast thereto, a high production speed can be achieved even under a constant mechanical shear force. Thus, it is possible in the present invention to use a down-sized mixer, which brings about a large economical advantage.

What is claimed is:

1. A process for producing a rubber reinforced styrene-based resin which comprises the following steps:
   a step of prepolymerizing a styrene-based monomer stock solution containing from 2 to 15% by weight of a rubbery polymer;
   a step of feeding a prepolymer liquid prepolymerized in the above step into a circulating reactor via a mixing means;
   a step of polymerizing the prepolymer liquid fed into the circulating reactor to obtain a polymer liquid;
   a step of circulating a portion of the polymer liquid from the circulating reactor back into the mixing means at a flow amount of from about 0.5 to 3 times the flow amount of the prepolymer liquid fed into the mixing means, and substantially uniformly mixing the prepolymer liquid and the polymer liquid; and
   a step of further polymerizing the polymer liquid polymerized in the circulating reactor, in a plug-flow type reactor.

2. The process for producing a rubber reinforced styrene-based resin according to claim 1, which is conducted using a polymerization apparatus comprising a prepolymerizer, mixing means, a circulating reactor connected with the mixing means by a circulation line and a plug-flow type reactor.

3. The process for producing a rubber reinforced styrene-based resin according to claim 1 or 2, wherein the rubbery polymer contained in the mixed liquid in the mixing means is particulated and dispersed by mechanical shear force.

4. The process for producing a rubber reinforced styrene-based resin according to claim 1, wherein the prepolymerization step is performed in a plug-flow type polymerizer.

5. The process for producing a rubber reinforced styrene-based resin according to claim 1, wherein the circulating reactor is a plug-flow type reactor.

6. The process for producing a rubber reinforced styrene-based resin according to claim 1, wherein the polymer concentration in the circulated liquid fed from the circulating reactor into the mixing means is adjusted to from 3.7A to 45% by weight, provided that A represents the concentration (expressed in % by weight) of the rubbery polymer in the stock solution.

7. The process for producing a rubber reinforced styrene-based resin according to claim 1, wherein the polymer concentration fed from the prepolymerizer into the mixing means is adjusted to from 1.2A to 2.8A % by weight, provided that A represents the concentration (expressed in % by weight) of the rubbery polymer in the stock solution.

8. The process for producing a rubber reinforced styrene-based resin according to claim 2, wherein the reaction temperatures in the prepolymerization, circulating reactor and plug-flow type reactor are from 90 to 120° C., from 90 to 140° C. and from 110 to 170° C., respectively.

9. The process for producing a rubber reinforced styrene-based resin according to claim 1, wherein the obtained rubber reinforced styrene based resin contains rubber particles in a size from 0.8 to 3 µm.

10. A process for producing a rubber reinforced styrene-based resin comprising the following steps:

prepolymerizing a styrene-based monomer stock solution containing from 85 to 98% by weight of styrene-based monomer and from 2 to 15% by weight of a rubbery polymer;

feeding a prepolymer liquid obtained from the prepolymerization: step above into a circulating reactor via a mixing means;

polymerizing the prepolymer liquid fed into the circulating reactor to obtain a polymer liquid;

circulating a portion of the polymer liquid from the circulating reactor back into the mixing means and substantially uniformly mixing the prepolymer liquid and the polymer liquid, wherein the polymer liquid has a flow amount of from about 0.5 to 3 times the flow amount of the prepolymer liquid fed into the mixing means; and a step of further polymerizing the polymer liquid polymerized in the circulating reactor, in a plug-flow type reactor.

11. The process for producing a rubber reinforced styrene-based resin according to claim 10, wherein the stock solution further comprises an initiator.

12. The process for producing a rubber reinforced styrene-based resin according to claim 11, wherein the initiator has 10 hours-half life temperatures of 70 to 140° C.

13. The process for producing a rubber reinforced styrene-based resin according to claim 10, wherein the rubbery polymer is selected from the group consisting of polybutadiene, SBR, polyisoprene, nitrile rubber and natural rubber.

14. The process for producing a rubber reinforced styrene-based resin according to claim 1, wherein the capacity of the mixing means is from 1/5 to 1/20 by volume of the capacity of the circulating reactor.

15. The process for producing a rubber reinforced styrene-based resin according to claim 1, wherein the capacity of the mixing means is 1/12 by volume of the capacity of the circulating reactor.

* * * * *